(12) United States Patent
Cha et al.

(10) Patent No.: US 10,689,736 B2
(45) Date of Patent: Jun. 23, 2020

(54) ULTRA-HIGH-STRENGTH SPRING STEEL FOR VALVE SPRING

(71) Applicants: HYUNDAI MOTOR COMPANY, Seoul (KR); HYUNDAI STEEL COMPANY, Incheon (KR); Korea Institute of Science and Technology, Seoul (KR)

(72) Inventors: Sung Chul Cha, Seoul (KR); Bong Lae Jo, Yongin-si (KR); Sang Min Song, Asan-si (KR); Jae Hyeok Shim, Seoul (KR)

(73) Assignees: Hyundai Motor Company, Seoul (KR); Hyundai Steel Company, Incheon (KR); Korea Institute of Science and Technology, Seoul (KR)

( * ) Notice: Subject to any disclaimer, the term of this patent is extended or adjusted under 35 U.S.C. 154(b) by 514 days.

(21) Appl. No.: 15/139,231

(22) Filed: Apr. 26, 2016

(65) Prior Publication Data

US 2017/0159161 A1 Jun. 8, 2017

(30) Foreign Application Priority Data

Dec. 7, 2015 (KR) .................. 10-2015-0173244

(51) Int. Cl.
 *C22C 37/00* (2006.01)
 *C22C 38/54* (2006.01)
 (Continued)

(52) U.S. Cl.
 CPC ............ *C22C 38/54* (2013.01); *C22C 38/001* (2013.01); *C22C 38/002* (2013.01); *C22C 38/02* (2013.01);
 (Continued)

(58) Field of Classification Search
 CPC ....... C22C 38/04; C22C 38/02; C22C 38/002; C22C 38/001; C22C 38/22; C22C 38/46;
 (Continued)

(56) References Cited

U.S. PATENT DOCUMENTS 4,770,721 A 9/1988 Yamamoto et al.
5,776,267 A 7/1998 Nanba et al.
(Continued)

FOREIGN PATENT DOCUMENTS

CN 102586692 A 7/2012
EP 2947168 A1 11/2015
(Continued)

OTHER PUBLICATIONS

Korean Office Action dated Oct. 25, 2016 issued in Korean Patent Application No. 10-2015-0173244.
(Continued)

*Primary Examiner* — Erin B Saad
(74) *Attorney, Agent, or Firm* — Morgan, Lewis & Bockius LLP

(57) ABSTRACT

An ultra-high-strength spring steel for an engine valve spring steel comprises, by weight: 0.5-0.7% of carbon (C), 1.3-2.3% of silicon (Si), 0.6-1.2% of manganese (Mn), 0.6-1.2% of chrome (Cr), 0.1-0.5% of molybdenum (Mo), 0.05-0.8% of nickel (Ni), 0.05-0.5% of vanadium (V), 0.05-0.5% of niobium (Nb), 0.05-0.3% of titanium (Ti), 0.001-0.01% of boron (B), 0.01-0.52% of tungsten (W), 0.3% or less (0% exclusive) of copper (Cu), 0.3% or less (0% exclusive) of aluminum (Al), 0.03% or less (0% exclusive) of nitrogen (N), 0.003% or less (0% exclusive) of oxygen (O), and a remainder of Fe and other inevitable impurities, based on 100% by weight of the ultra-high-strength spring steel.

5 Claims, 4 Drawing Sheets

(51) Int. Cl.

| | | |
|---|---|---|
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *F01L 1/46* | (2006.01) | |
| *C21D 9/02* | (2006.01) | |
| *F16F 1/02* | (2006.01) | |

(52) U.S. Cl.
CPC .............. *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *F01L 1/462* (2013.01); *C21D 9/02* (2013.01); *C21D 2211/008* (2013.01); *F16F 1/021* (2013.01)

(58) Field of Classification Search
CPC ......... C22C 38/12; C22C 38/14; C22C 38/24; C22C 38/26; C22C 38/08; C22C 38/28; C22C 38/42; C22C 38/44; C22C 38/00; C22C 38/06; C22C 38/34; C22C 38/50
See application file for complete search history.

(56) References Cited

U.S. PATENT DOCUMENTS

| | | | |
|---|---|---|---|
| 6,277,220 | B1 | 8/2001 | Hamada |
| 6,322,747 | B1 | 11/2001 | Fukuzumi et al. |
| 7,789,974 | B2 | 9/2010 | Hashimura et al. |
| 8,303,455 | B2 | 11/2012 | Gumpoltsberger et al. |
| 2008/0279714 | A1 | 11/2008 | Hashimura et al. |
| 2008/0308195 | A1 | 12/2008 | Yoshihara et al. |
| 2009/0007998 | A1 | 1/2009 | Kochi et al. |
| 2009/0065105 | A1 | 3/2009 | Kochi et al. |
| 2009/0092516 | A1 | 4/2009 | Hashimura et al. |
| 2009/0205753 | A1 | 8/2009 | Hashimura et al. |
| 2010/0028196 | A1 | 2/2010 | Hashimura et al. |
| 2013/0127100 | A1 | 5/2013 | Ishida et al. |
| 2015/0369322 | A1 | 12/2015 | Sugimura et al. |
| 2016/0053352 | A1 | 2/2016 | Aono et al. |
| 2017/0044633 | A1* | 2/2017 | Hashimura et al. .................. B22D 11/115 |
| 2017/0298486 | A1 | 10/2017 | Cha et al. |

FOREIGN PATENT DOCUMENTS

| | | | |
|---|---|---|---|
| JP | H05-148581 A | 6/1993 | |
| JP | H05-214489 A | 8/1993 | |
| JP | H10-110247 A | 4/1998 | |
| JP | 2001-181788 A | 7/2001 | |
| JP | 2003-105485 A | 4/2003 | |
| JP | 2006-028599 A | 2/2006 | |
| JP | 2006-183137 A | 7/2006 | |
| JP | 2007-224413 A | 9/2007 | |
| JP | 2012-072492 A | 4/2012 | |
| JP | 5200540 B2 | 6/2013 | |
| JP | 2014-136810 A | 7/2014 | |
| JP | 2015-120940 A | 7/2015 | |
| KR | 10-0213542 B1 | 8/1999 | |
| KR | 2002-0083181 A | 11/2002 | |
| KR | 10-2008-0009699 A | 1/2008 | |
| KR | 10-2008-0009713 A | 1/2008 | |
| KR | 2008-0057205 A | 6/2008 | |
| KR | 10-0851083 B1 | 8/2008 | |
| KR | 10-2008-0111688 A | 12/2008 | |
| KR | 10-2009-0071163 A | 7/2009 | |
| KR | 10-2010-0004352 A | 1/2010 | |
| KR | 10-2010-0019603 A | 2/2010 | |
| KR | 10-2010-0077250 A | 7/2010 | |
| KR | 10-0968938 B1 | 7/2010 | |
| KR | 10-2010-0103243 A | 9/2010 | |
| KR | 10-2011-0075318 A | 7/2011 | |
| KR | 10-1401625 B1 | 6/2014 | |
| KR | 10-2015-0093210 A | 8/2015 | |
| SU | 1184867 A | 10/1985 | |
| WO | 99/067437 A1 | 12/1999 | |
| WO | 2002/050327 A1 | 6/2002 | |
| WO | 2007/114490 A1 | 10/2007 | |
| WO | 2014/112532 A1 | 7/2014 | |
| WO | WO-2015162928 A1 * | 10/2015 | ........... B22D 11/115 |

OTHER PUBLICATIONS

U.S. Office Action dated Jul. 19, 2018 issued in U.S. Appl. No. 15/179,712.
Extended European Search Report dated May 2, 2017 issued in European Patent Application No. 16175227.4.
U.S. Non-Final Office Action dated Jul. 26, 2018 issued in U.S. Appl. No. 15/342,636.
U.S. Final Office Action dated Nov. 21, 2018 issued in U.S. Appl. No. 15/179,712.
U.S. Non-Final Office Action dated Jun. 13, 2019 issued in U.S. Appl. No. 15/342,811.
U.S. Non-Final Office Action dated Jun. 13, 2019 issued in U.S. Appl. No. 15/342,636.
Office Action issued in corresponding U.S. Appl. No. 15/179,712, dated Apr. 24, 2019.
Final Office Action issued in U.S. Appl. No. 15/342,636 dated Feb. 25, 2019.
Final Office Action issued in U.S. Appl. No. 15/342,811 dated Feb. 26, 2019.
Villasenor-Ochoa, Humberto, "Engineering Fundamentals Refresh: Strength vs Stiffness vs Hardness", retrieved from https://www.fictiv.com/hwg/design/engineering-fundamentals-refresh-strength-vs-stiffness-vs-hardness, 12 pages, Feb. 15, 2017.
Bossard, "Difference Between Hardness and Strength in Steel", retrieved from https://web.archive.org/web/20160805211012/https://provenproductivity.com/difference-between-hardness-and-strength-in-steel, 1 page, 2016.
Chinese Office Action dated Sep. 27, 2019 issued in Chinese Patent Application No. 201610341286.9.
Japanese Office Action dated Dec. 13, 2019 issued in Japanese Patent Application No. 2016-126993 (with English Translation).
Japanese Office Action dated Dec. 13, 2019 issued in Japanese Patent Application No. 2016-126995 (with English translation).

* cited by examiner

| wt.% | C | Si | Mn | Cr | Mo | Ni | V | Nb | Ti | B | W | Cu | Al | N | O |
|---|---|---|---|---|---|---|---|---|---|---|---|---|---|---|---|
| conventional steel | 0.55 | 0.45 | 0.71 | 0.72 | - | - | - | - | - | - | - | 0.05 | 0.0017 | 0.0022 | 0.0015 |
| Ex. 1 | 0.66 | 1.55 | 0.62 | 0.92 | 0.11 | 0.32 | 0.06 | 0.46 | 0.06 | 0.003 | 0.1 | 0.056 | 0.008 | 0.0017 | 0.0006 |
| Ex. 2 | 0.67 | 1.32 | 0.74 | 0.82 | 0.3 | 0.21 | 0.32 | 0.24 | 0.16 | 0.002 | 0.32 | 0.06 | 0.019 | 0.0015 | 0.0008 |
| Ex. 3 | 0.65 | 2.15 | 1.18 | 1.17 | 0.49 | 0.77 | 0.47 | 0.06 | 0.28 | 0.009 | 0.51 | 0.043 | 0.014 | 0.0018 | 0.001 |
| C. Ex. 1 | 0.57 | 1.52 | 0.64 | 0.94 | 0.09 | 0.35 | 0.13 | 0.08 | 0.09 | 0.004 | 0.12 | 0.067 | 0.014 | 0.0012 | 0.0011 |
| C. Ex. 2 | 0.68 | 1.34 | 0.72 | 0.78 | 0.52 | 0.74 | 0.18 | 0.24 | 0.15 | 0.003 | 0.34 | 0.043 | 0.014 | 0.0017 | 0.0014 |
| C. Ex. 3 | 0.61 | 1.59 | 1.17 | 1.14 | 0.45 | 0.82 | 0.49 | 0.48 | 0.24 | 0.009 | 0.52 | 0.046 | 0.011 | 0.0012 | 0.001 |
| C. Ex. 4 | 0.52 | 1.64 | 0.63 | 0.83 | 0.15 | 0.04 | 0.37 | 0.11 | 0.16 | 0.004 | 0.15 | 0.054 | 0.008 | 0.0011 | 0.0007 |
| C. Ex. 5 | 0.68 | 2.23 | 0.75 | 0.76 | 0.34 | 0.34 | 0.04 | 0.29 | 0.11 | 0.001 | 0.34 | 0.067 | 0.014 | 0.0012 | 0.0011 |
| C. Ex. 6 | 0.67 | 2.29 | 1.19 | 1.15 | 0.42 | 0.78 | 0.52 | 0.49 | 0.29 | 0.006 | 0.51 | 0.043 | 0.014 | 0.0017 | 0.0014 |
| C. Ex. 7 | 0.66 | 1.37 | 0.72 | 0.79 | 0.13 | 0.36 | 0.46 | 0.04 | 0.09 | 0.004 | 0.14 | 0.046 | 0.011 | 0.0012 | 0.001 |
| C. Ex. 8 | 0.63 | 2.15 | 1.18 | 1.19 | 0.37 | 0.74 | 0.19 | 0.52 | 0.16 | 0.003 | 0.35 | 0.065 | 0.014 | 0.0016 | 0.0008 |
| C. Ex. 9 | 0.53 | 1.95 | 0.76 | 0.93 | 0.19 | 0.32 | 0.22 | 0.26 | 0.04 | 0.008 | 0.5 | 0.046 | 0.011 | 0.0017 | 0.0012 |
| C. Ex. 10 | 0.61 | 1.86 | 0.75 | 0.76 | 0.35 | 0.71 | 0.42 | 0.15 | 0.31 | 0.002 | 0.11 | 0.054 | 0.007 | 0.0011 | 0.0009 |
| C. Ex. 11 | 0.62 | 1.47 | 0.88 | 0.75 | 0.12 | 0.38 | 0.41 | 0.46 | 0.09 | 0.0008 | 0.34 | 0.067 | 0.014 | 0.0015 | 0.0012 |
| C. Ex. 12 | 0.67 | 1.85 | 1.16 | 1.16 | 0.34 | 0.7 | 0.32 | 0.08 | 0.14 | 0.012 | 0.49 | 0.043 | 0.013 | 0.0017 | 0.0005 |
| C. Ex. 13 | 0.53 | 1.96 | 0.98 | 0.94 | 0.18 | 0.35 | 0.42 | 0.29 | 0.18 | 0.005 | 0.008 | 0.046 | 0.011 | 0.0012 | 0.001 |
| C. Ex. 14 | 0.59 | 1.66 | 0.79 | 0.78 | 0.39 | 0.72 | 0.44 | 0.17 | 0.26 | 0.001 | 0.54 | 0.043 | 0.014 | 0.0017 | 0.0014 |

FIG. 1

| wt.% | yield strength (MPa) | tensile strength (MPa) | hardness (HV) | fatigue strength (MPa) | moldability | fatigue life | inclusion regulation | Improvement in carbon fraction by > 7% and in carbon activity by > 3% |
|---|---|---|---|---|---|---|---|---|
| conventional steel | 1950 | 2340 | 620 | 830 | Pass | 22 x 10⁴ cycles | Pass | X |
| Ex. 1 | 2515 | 3018 | 782 | 1241 | Pass | 53 x 10⁴ cycles | Pass | O |
| Ex. 2 | 2542 | 3078 | 775 | 1229 | Pass | 54 x 10⁴ cycles | Pass | O |
| Ex. 3 | 2522 | 3013 | 769 | 1235 | Pass | 57 x 10⁴ cycles | Pass | O |
| C. Ex. 1 | 1970 | 2365 | 615 | 815 | Fail | 20 x 10⁴ cycles | Pass | X |
| C. Ex. 2 | 2355 | 2810 | 715 | 985 | Pass | 42 x 10⁴ cycles | Pass | O |
| C. Ex. 3 | 2215 | 2655 | 695 | 1055 | Pass | 39 x 10⁴ cycles | Pass | O |
| C. Ex. 4 | 2195 | 2635 | 685 | 1015 | Pass | 26 x 10⁴ cycles | Pass | O |
| C. Ex. 5 | 2155 | 2570 | 690 | 840 | Pass | 28 x 10⁴ cycles | Pass | X |
| C. Ex. 6 | 2235 | 2670 | 710 | 850 | Pass | 26 x 10⁴ cycles | Fail | O |
| C. Ex. 7 | 2170 | 2615 | 676 | 995 | Pass | 26 x 10⁴ cycles | Pass | X |
| C. Ex. 8 | 2260 | 2690 | 685 | 1060 | Pass | 35 x 10⁴ cycles | Pass | O |
| C. Ex. 9 | 2080 | 2485 | 657 | 840 | Pass | 19 x 10⁴ cycles | Pass | X |
| C. Ex. 10 | 2170 | 2580 | 620 | 985 | Pass | 34 x 10⁴ cycles | Pass | O |
| C. Ex. 11 | 2440 | 2905 | 753 | 1020 | Pass | 40 x 10⁴ cycles | Fail | O |
| C. Ex. 12 | 2170 | 2600 | 675 | 970 | Pass | 28 x 10⁴ cycles | Pass | O |
| C. Ex. 13 | 2180 | 2620 | 685 | 1000 | Pass | 27 x 10⁴ cycles | Pass | X |
| C. Ex. 14 | 2340 | 2825 | 713 | 975 | Pass | 40 x 10⁴ cycles | Pass | O |

FIG. 2

ULTRA-HIGH-STRENGTH SPRING STEEL FOR VALVE SPRING

CROSS REFERENCE TO RELATED APPLICATION

The present application claims the benefit of priority to Korean Patent Application No. 10-2015-0173244, filed on Dec. 7, 2015, the entire content of which is incorporated herein for all purposes by this reference.

TECHNICAL FIELD

The present disclosure relates to an ultra-high-strength steel. More particularly, the present disclosure relates to an ultra-high-strength steel that has improved tensile strength and fatigue strength suitable for an engine valve spring.

BACKGROUND

With declination of fossil fuel reserves and sudden rise and change of oil prices, intensive worldwide attention has been paid to improvement in fuel efficiency of vehicles.

For fuel efficiency improvement, weight reduction design of vehicle bodies and minimization of power loss by reducing frictions at system links have been developed. Further, maximization of output efficiency increases fuel efficiency by improving dynamic characteristics upon exhaustion control of an engine itself. In regard to the improvement of fuel efficiency, efforts have been made to reduce a dynamic load through weight reduction of dynamic components of the engine head.

Among the dynamic components, an engine valve spring is a component that may make a great contribution to fuel efficiency if its weight is reduced because the engine valve directly controls a dynamic load. Conventionally, valve springs are made mainly of CrSi steel with a tensile strength of 1900 MPa or CrSiV steel with a tensile strength of 2100 MPa. Further, attempts have been made to increase the tensile strength to 2550 MPa by adding alloy elements to the CrSiV steel.

SUMMARY

The present disclosure has been made keeping in mind the above problems occurring in the prior art, and an aspect of the present disclosure provides a ultra-high-strength spring steel having improved tensile strength by optimizing contents of Mo, Ni, V, Nb, Ti, B, and W and fatigue strength by controlling inclusions formed therein.

According to an embodiment in the present disclosure, a ultra-high-strength spring steel suitable for a valve spring in a vehicle engine comprises 0.5-0.7% by weight of carbon (C), 1.3-2.3% by weight of silicon (Si), 0.6-1.2% by weight of manganese (Mn), 0.6-1.2% by weight of chrome (Cr), 0.1-0.5% by weight of molybdenum (Mo), 0.05-0.8% by weight of nickel (Ni), 0.05-0.5% by weight of vanadium (V), 0.05-0.5% by weight of niobium (Nb), 0.05-0.3% by weight of titanium (Ti), 0.001-0.01% by weight of boron (B), 0.01-0.52% by weight of tungsten (W), 0.3% or less (0% exclusive) by weight of copper (Cu), 0.3% or less (0% exclusive) by weight of aluminum (Al), 0.03% or less (0% exclusive) by weight of nitrogen (N), 0.003% or less (0% exclusive) by weight of oxygen (O), a remainder of Fe, and inevitable impurities, based on 100% by weight of the ultra-high-strength spring steel.

The ultra-high-strength spring steel has a tensile strength of 3000 MPa or higher.

The ultra-high-strength spring steel has a fatigue strength of 1200 MPa or higher.

The ultra-high-strength spring steel has a yield strength of 2500 MPa or higher.

The ultra-high-strength spring steel has a hardness of 760 HV or higher.

The ultra-high-strength spring steel contains inclusions having a diameter of 15 μm or less.

The inclusions may be contained at a fraction of 10% or less with a diameter of 10-15 μm and at a fraction of 90% or more with a diameter of 10 μm.

BRIEF DESCRIPTION OF THE DRAWINGS

The above and other objects, features and advantages of the present disclosure will be more clearly understood from the following detailed description taken in conjunction with the accompanying drawings.

FIG. 1 is a table in which components of steels of Examples and Comparative Examples are listed.

FIG. 2 is a table in which physical properties and performances of steels of Examples and Comparative Examples are summarized.

DETAILED DESCRIPTION

For illustrative purposes, the principles of the present disclosure are described by referencing various exemplary embodiments. Although certain embodiments in the disclosure are specifically described herein, one of ordinary skill in the art will readily recognize that the same principles are equally applicable to, and can be employed in other systems and methods. Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; however, the novel method is therefore not limited to the particular arrangement of steps disclosed herein.

Figure 3:
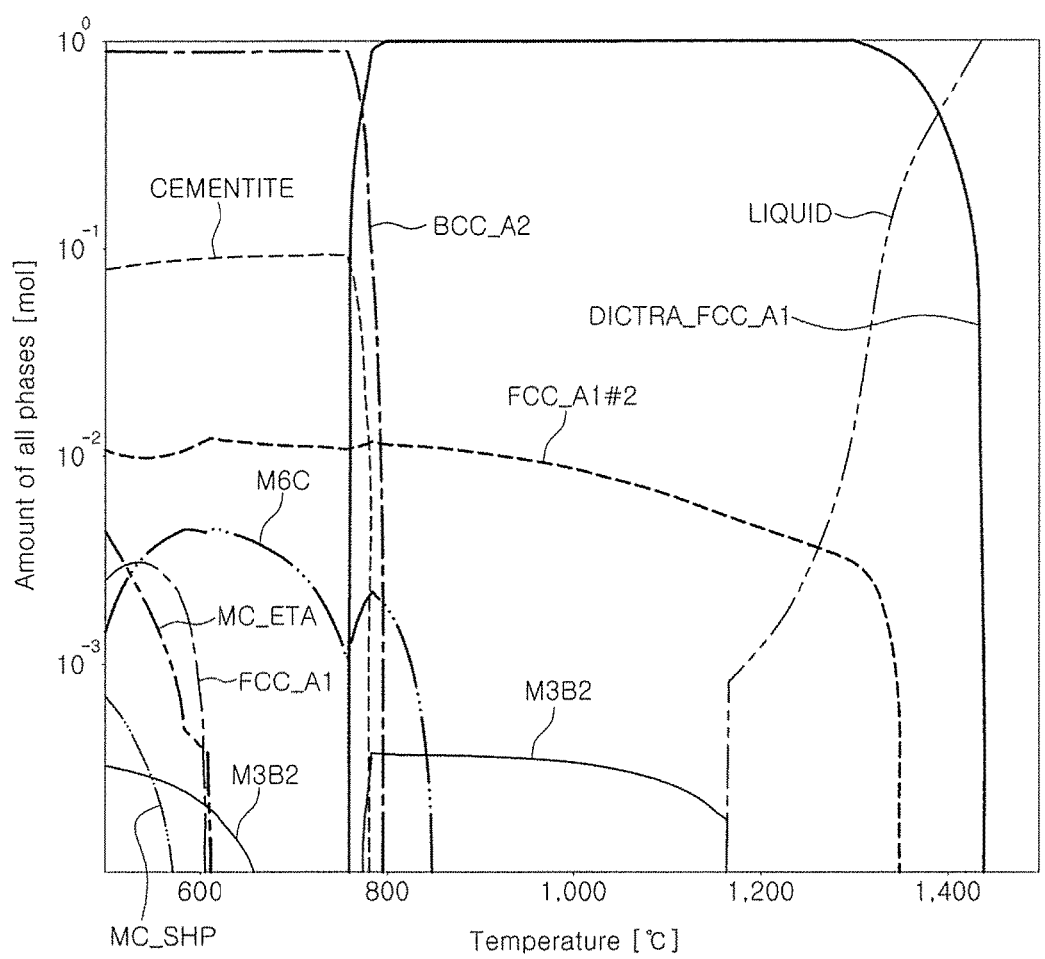
FIG. 3 is a graph showing a phase transformation of an ultra-high-strength spring steel according to an embodiment in the present disclosure against temperature.
Figure 4:
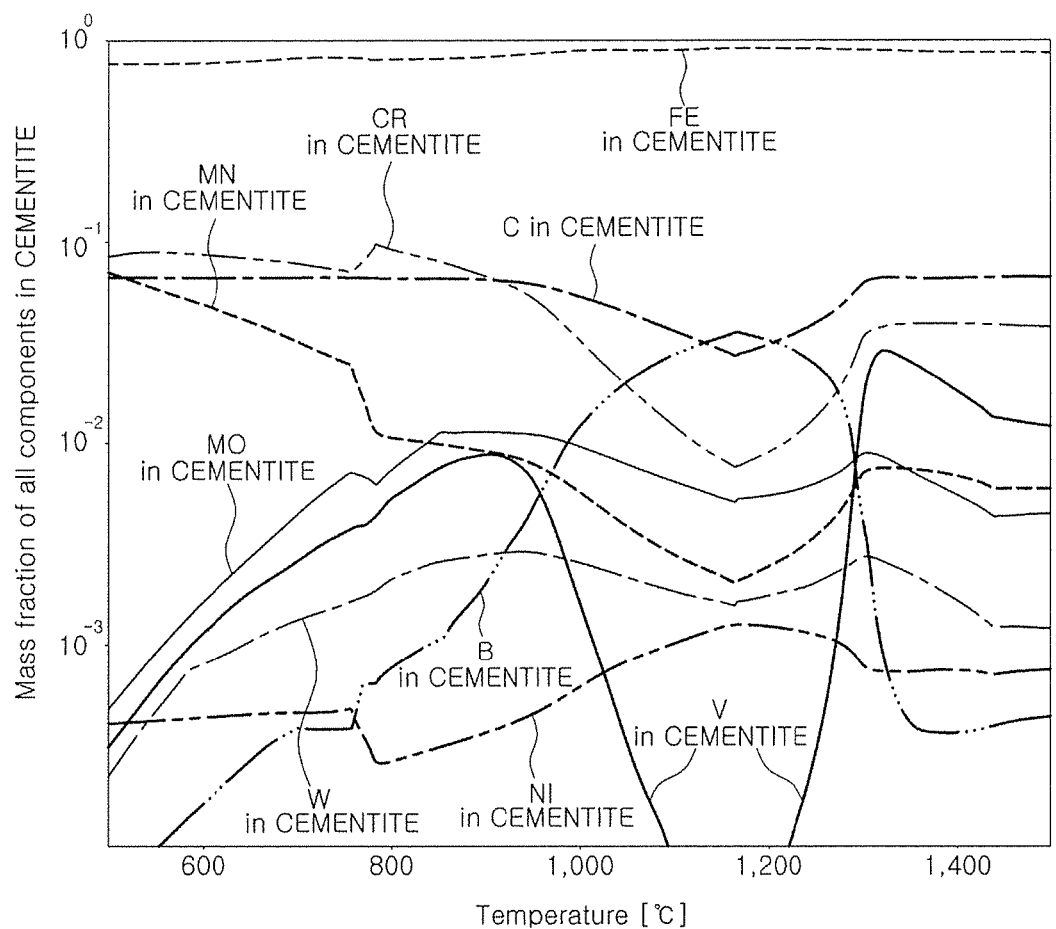
FIG. 4 is a graph showing the phase transformation of an ultra-high-strength spring steel according to an embodiment in the present disclosure into cementite against temperature.

FIG. 3 is a graph showing the phase transformation of an ultra-high-strength spring steel according to an embodiment in the present disclosure against temperature, and FIG. 4 is a graph showing the phase transformation of an ultra-high-strength spring steel according to an embodiment in the present disclosure into cementite against temperature.

An ultra-high-strength spring steel according to the present disclosure, which is suitable for a valve spring in a vehicle engine, exhibits improved properties such as tensile strength and fatigue strength as contents of its main alloy components are optimized. In detail, the ultra-high-strength spring steel according to the present disclosure comprises: 0.5-0.7% by weight of carbon (C), 1.3-2.3% by weight of silicon (Si), 0.6-1.2% by weight of manganese (Mn), 0.6-1.2% by weight of chrome (Cr), 0.1-0.5% by weight of molybdenum (Mo), 0.05-0.8% by weight of nickel (Ni), 0.05-0.5% by weight of vanadium m, 0.05-0.5% by weight of niobium (Nb), 0.05-0.3% by weight of titanium (Ti), 0.001-0.01% by weight of boron (B), 0.01-0.52% by weight of tungsten (W), 0.3% or less (0% exclusive) by weight of copper (Cu), 0.3% or less (0% exclusive) by weight of aluminum (Al), 0.03% or less (0% exclusive) by weight of nitrogen (N), 0.003% or less (0% exclusive) by weight of oxygen (O), a remainder of Fe, and other inevitable impurities, based on 100% by weight of the ultra-high-strength spring steel.

Hereinbelow, reasons for numerical limitations of the components in the composition according to the present disclosure will be described. Unless described otherwise, the unit % given in the following description means % by weight.

Carbon (C) is contained in an amount of 0.5-0.7% in the ultra-high-strength steel according to a certain embodiment. The strength of steel increases with an increase in carbon content. With a carbon content of less than 0.5%, the steel slightly increases in strength because of insufficient quenching properties upon heat treatment. On the other hand, a carbon content exceeding 0.7% induces formation of a martensitic phase upon quenching, resulting in a decrease in fatigue strength and toughness. Within the range, the steel is provided with high strength and ductility.

Silicon (Si) is contained in an amount of 1.3-2.3% in the ultra-high-strength steel according to a certain embodiment. Forming a solid solution in ferrite with iron, strength and temper softening resistance of silicon may increase. With a silicon content less than 1.3%, the steel has poor temper softening resistance. On the other hand, a silicon content exceeding 2.3% may cause a decarburizing phenomenon upon heat treatment.

Manganese (Mn) is contained in an amount of 0.6-1.2% in the ultra-high-strength steel according to a certain embodiment. Forming a solid solution in a matrix, manganese improves bending fatigue strength and quenching properties. When used in an amount less than 0.6%, manganese cannot guarantee quenching properties. A manganese content of greater than 1.2% decreases toughness.

Chrome (Cr) is contained in an amount of 0.6-1.2% in the ultra-high-strength steel according to a certain embodiment. Chrome has various functions of inducing formation of carbide deposits useful for toughness upon tempering, improving hardenability, and increasing strength by suppressing softening. Further, chrome increases toughness of the steel by microstructural refinement. With a Cr content of 0.6% or higher, chrome exhibits excellent effects in terms of temper softening, decarburizing, quenching, and corrosion resistance. A manganese content exceeding 1.2% causes formation of excessively large grain boundary carbides, with deterioration of strength and increase in brittleness.

Molybdenum (Mo) is contained in an amount of 0.1-0.5% the ultra-high-strength steel according to a certain embodiment. Like Cr, molybdenum forms microstructural carbide deposits to improve strength and fracture toughness. Particularly, the uniform formation of 1-5 nm TiMoC improves tempering resistance and guarantees thermal resistance and high strength. When used in an amount less than 0.1%, molybdenum cannot form carbides, failing to acquire sufficient strength. On the other hand, a molybdenum content exceeding 0.5% is disadvantageous in terms of cost since the carbide deposits and the strength improvement effects are already saturated.

Nickel (Ni) is contained in an amount of 0.05-0.8% in the ultra-high-strength steel according to a certain embodiment. Nickel is an element that improves corrosion resistance of the steel. It also plays a role in improving thermal resistance, cold shortness, hardenability, dimensional stability, and settability. With a nickel content of less than 0.05%, the steel becomes poor in corrosion resistance and high-temperature stability. On the other hand, the steel may undergo red shortness when the nickel content exceeds 0.8%.

Vanadium (V) is contained in an amount of 0.05-0.5% in the ultra-high-strength steel according to a certain embodiment. Vanadium improves microstructural refinement, tempering resistance, dimensional stability, and settability, and increases thermal resistance and high strength. It forms a microstructural deposit vanadium carbide (VC) to increase fractural toughness. Particularly, the microstructural deposit VC restrains migration of grain boundaries. V is dissolved upon austenitizing to form a solid solution, and is deposited upon tempering to generate secondary hardening. With a vanadium content less than 0.05%, the fractural toughness may be not prevented from decreasing. When vanadium is used in an amount exceeding 0.5%, the steel may contain coarse deposits and decrease in strength after quenching.

Niobium (Nb) is contained in an amount of 0.05-0.5% in the ultra-high-strength steel according to a certain embodiment. Niobium induces microstructural refinement, hardens the steel surface through nitrization, and improves dimensional stability. The formation of NbC increases the steel strength, and controls formation rates of other carbides (e.g., CrC, VC, TiC, MoC). With a niobium content of less than 0.05%, the steel may decrease in strength and may have a non-uniform distribution of the carbide. When the niobium content is higher than 0.5%, the formation of the other carbides may be restrained.

Titanium (Ti) is contained in an amount of 0.05-0.3% the ultra-high-strength steel according to a certain embodiment. Like Nb, and Al, titanium prevents or restrains grain recrystallization and growth. In addition, titanium forms nanocarbides such as TiC, TiMoC, etc., and reacts with nitrogen to form TiN that restrains grain growth. Further, it forms $TiB_2$ that interferes with binding between B and N, with the consequent minimization of the BN-induced quenching property degradation. With a titanium content less than 0.05%, other inclusions such as $Al_2O_3$ are formed, thus decreasing fatigue endurance. A titanium content exceeding 0.3% interferes with the roles of other alloy elements and incurs the rise of cost.

Boron (B) is contained in an amount of 0.001-0.01% in the ultra-high-strength steel according to a certain embodiment. Boron improves tensile strength and elongation, preventing corrosion, and increases corrosion resistance and impact resistance. With a boron content of less than 0.001%, the steel has a poor strength. On the other hand, a boron content exceeding 0.01% causes a decrease in toughness, thus providing poor impact resistance for the steel.

Tungsten (W) is contained in an amount of 0.01-0.52% the ultra-high-strength steel according to a certain embodiment. Tungsten is an element that forms carbide deposits, thereby improving high-temperature wear resistance and toughness, restraining structural growth, and reducing scale resistance. When the content of tungsten is below 0.01%, a desired degree of high-temperature wear resistance cannot be maintained while formation of the carbides decreases. When the content of tungsten is over 0.52%, excessive WC is formed, resulting in a decrease in toughness.

Copper (Cu) is contained in an amount of 0.3% or less (0% exclusive) in the ultra-high-strength steel according to a certain embodiment. Copper is an element that increases quenching properties and strength after tempering, and improves the corrosion resistance of the steel. A copper content is limited to 0.3% or less since an excessive amount of copper increases production cost.

Aluminum (Al) is contained in an amount of 0.3% or less (0% exclusive) in the ultra-high-strength steel according to a certain embodiment. Aluminum forms AlN with nitrogen to induce refinement of austenite and to improve strength and impact toughness. Particularly, the addition of aluminum together with Nb, Ti, and Mo can reduce the amount of expensive elements including vanadium for microstructural refinement and nickel for toughness improvement. However, the content of aluminum is limited to 0.3% or less since an excessive amount of aluminum weakens the steel.

Nitrogen (N) is contained in an amount of 0.03% or less (0% exclusive) in the ultra-high-strength steel according to a certain embodiment. Nitrogen forms AlN and TiN with Al and Ti, respectively, exhibiting microstructural refinement. Particularly, TiN makes great contribution to the quenching property of boron. However, a nitrogen content is limited to 0.03% or less since an excessive amount of nitrogen reacts with boron with reduction of quenching properties.

Oxygen (O) is contained in an amount of 0.003% or less (0% exclusive) in the ultra-high-strength steel according to a certain embodiment. Oxygen binds to Si or Al to form non-metallic, oxide-based inclusions, inducing a decrease in fatigue life property. Hence, a less amount of oxygen is better. In this disclosure, an oxygen content of up to 0.003% is allowable.

In addition to the aforementioned components, the ultra-high-strength spring steel comprises a balanced amount of Fe and inevitable impurities to form 100%.

Below, a detailed description will be given with reference to Examples and Comparative Examples.

Spring steels of Examples and Comparative Examples were made under a condition for commercially available spring steels. Wire rods from molten steels in which components were used at various contents as shown in FIG. 1 were prepared into steel wires through the consecutive processes of isothermal treatment, wire drawing, quenching-tempering, and solder quenching. For example, the wire rods were maintained at 940-960° C. for 3-5 min, cooled to 640-660° C. and maintained at the temperature for 2-4 min, followed by cooling to 18-22° C. for 0.5-1.5 min. This isothermal treatment was adapted to facilitate the subsequent wire drawing process. Through the thermal treatment, pearlite was formed in the wire rods.

After the isothermal treatment, the wire rods were subjected to various steps of wire drawing to have a target wire diameter. In the present disclosure, the wire rods with a diameter of 3.3 mm were drawn.

The drawn wire rods were heated to and maintained at 940-960° C. for 3-5 min, and quenched to 45-55° C., followed by tempering for 0.5-1.5 min. Thereafter, the wire rods were again heated to 440-460° C. and maintained for 2-4 min, and then subjected to solder quenching. The formation of martensite by quenching and tempering provided strength for the wire rods while the formation of tempered martensite by solder quenching increased strength and toughness.

In Test Examples, examination was made of physical properties of the spring steels of Examples and Comparative Examples.

The spring steels of Examples and Comparative Examples were tested for yield strength, hardness, fatigue strength, moldability, fatigue life, inclusion regulation, and improvement in carbon fraction and carbon activity, and the results are given in FIG. 2.

In this regard, yield strength and tensile strength were measured using a 20-ton tester on specimens with a diameter of 3.3 mm according to KS B 0802 and hardness was measured using a micro Vickers hardness tester at 300 gf according to KS B 0811. Fatigue strength and fatigue life were measured by performing a rotary bending fatigue test on specimens according to KS B ISO 1143. Moldability was determined to be normal if no breaks occurred when 10,000 valve springs with a diameter/wire diameter of 6.5 and a turn number of 8 were fabricated and molded.

For inclusion regulation, each specimen was rolled parallel, and cut along the median line. Maximum sizes of B- and C-type inclusions present in an area of 60 mm$^2$ of the cut surface were measured using a Max. t-method. Measurement was made under a microscope with 400-500 power magnification. A normal state was determined when the steel had inclusions with a diameter of 10-15 μm at a fraction of 10% or less and with a diameter of 10 μm or less at a fraction of 90% or more, with no inclusions with a diameter exceeding 15 μm. The B-type inclusions are a plurality of granular inclusions that are discontinuously lined up in a group in a processing direction, and may be, for example, alumina ($Al_2O_3$) inclusions. The C-type inclusions are inclusions that are formed by irregular dispersion without viscous deformation, and may be, for example, silicate ($SiO_2$) inclusions.

The improvement in carbon fraction and carbon activity was calculated using the software ThermoCalc based on a thermodynamic DB. Particularly, the carbon fraction was measured by mapping elemental distributions using SEM-EDX.

As is understood from the data of FIG. 2, the conventional steel that lacked Mo, Ni, V, Nb, Ti, B, and W did not meet any of the requirements of the present disclosure for yield strength, tensile strength, hardness, fatigue strength, moldability, and fatigue life although it satisfied with the inclusion regulation.

The steels of Comparative Examples 1 to 14 are different in component content from those according to the present disclosure, and failed to meet any of the requirements of the present disclosure although partially improving in yield strength, tensile strength, hardness, fatigue strength, moldability and fatigue life, compared to conventional steel.

Failing to acquire sufficient yield strength, particularly, the steel of Comparative Example 1, which contained a smaller amount of Mo, did not exhibit an improvement in hardness, compared to the conventional steel, and rather decreased in fatigue strength and fatigue life.

A larger content of vanadium was employed in Comparative Example 6 and a smaller content of boron in Comparative Example 11 than respective contents defined in the present disclosure. The steels failed in the inclusion regulation as their inclusions were coarse.

In Comparative Example 9, the Ti content was low. As the formation of other inclusions such as $Al_2O_3$ was promoted, the steel had deteriorated fatigue endurance, and thus, fatigue strength and fatigue life are decreased, compared to conventional steel.

In contrast, the steels of Examples 1 to 3 contain the components in amounts defined in the present disclosure, and all exhibited a yield strength of 2500 MPa or higher, a tensile strength of 3000 MPa or higher, and a hardness of 760 HV or higher. In addition, all of them were measured to have a fatigue strength of 1200 MPa or higher, and passed the tests for moldability and inclusion regulation. Fatigue life over 500,000 cycles was measured in the steels, and carbon fraction of the steels was improved by 7% or higher and in carbon activity by 3%, compared to conventional steel.

FIG. 3 is a graph showing the phase transformation of an ultra-high-strength spring steel according to an embodiment of the present disclosure against temperature, and FIG. 4 is a graph showing the phase transformation of an ultra-high-strength spring steel according to an embodiment of the present disclosure into cementite against temperature.

In FIG. 3, the phase transformation of a steel having an alloy composition of Fe-2.2Si-0.7Mn-0.9Cr-0.66C-0.3Ni-0.3Mo-0.3V-0.15Ti-0.003B-0.1W is shown against temperature. Given the alloy composition of the present disclosure, as shown in FIG. 3, the steel has various microinclusions such as CrC and VC, and Ti-rich, or Zr-rich carbides faulted during solidification, thus improving strength and fatigue life.

In FIG. 4, the phase transformation of a steel having an alloy composition of Fe-2.2Si-0.7Mn-0.9Cr-0.66C-0.3Ni-0.3Mo-0.3V-0.15Ti-0.003B-0.1W in cementite is shown against temperature. From the data of FIG. 4, it is understood that the complex behavior of octonary elements in cementite occurs, thus predicting the uniform distribution of microcarbides.

As described hitherto, the ultra-high-strength spring steel of the present disclosure has a tensile strength of 3000 MPa by optimizing contents of main alloy components and with a fatigue strength of 1200 MPa by inclusion refinement.

Although the exemplary embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. An ultra-high-strength spring steel for a valve spring in a vehicle engine, consisting essentially of: 0.5-0.7% by weight of carbon (C), 1.3-2.3% by weight of silicon (Si), 0.6-1.2% by weight of manganese (Mn), 0.6-1.2% by weight of chrome (Cr), 0.1-0.5% by weight of molybdenum (Mo), 0.05-0.8% by weight of nickel (Ni), 0.05-0.5% by weight of vanadium (V), 0.05-0.5% by weight of niobium (Nb), 0.05-0.3% by weight of titanium (Ti), 0.001-0.01% by weight of boron (B), 0.01-0.52% by weight of tungsten (W), 0.3% or less (0% exclusive) by weight of copper (Cu), 0.3% or less (0% exclusive) by weight of aluminum (Al), 0.03% or less (0% exclusive) by weight of nitrogen (N), 0.003% or less (0% exclusive) by weight of oxygen (O), a remainder of iron (Fe), and other inevitable impurities, based on 100% by weight of the ultra-high-strength spring steel,
    wherein the ultra-high-strength spring steel has a fatigue strength of 1200 MPa or higher, and
    wherein the ultra-high-strength spring steel has a hardness of 760 HV or higher.

2. The ultra-high-strength spring steel of claim 1, wherein the ultra-high-strength spring steel has a tensile strength of 3000 MPa or higher.

3. The ultra-high-strength spring steel of claim 1, wherein the ultra-high-strength spring steel has a yield strength of 2500 MPa or higher.

4. The ultra-high-strength spring steel of claim 1, wherein the ultra-high-strength spring steel contains inclusions which have a diameter of 15 μm or less.

5. The ultra-high-strength spring steel of claim 4, wherein the inclusions are contained at a fraction of 10% or less with a diameter of 10-15 μm in the total inclusions and at a fraction of 90% or more with a diameter of less than 10 μm in the total inclusions.

* * * * *